United States Patent
Phadke

(10) Patent No.: US 8,456,139 B2
(45) Date of Patent: Jun. 4, 2013

(54) POWER FACTOR CORRECTION CIRCUITS, SYSTEMS AND POWER SUPPLIES OPERABLE WITH DIFFERENT INPUT VOLTAGES

(75) Inventor: Vijay G. Phadke, Pasig (PH)

(73) Assignee: Astec International Limited, Kwun Tong, Kowloon (HK)

( * ) Notice: Subject to any disclaimer, the term of this patent is extended or adjusted under 35 U.S.C. 154(b) by 805 days.

(21) Appl. No.: 12/570,035

(22) Filed: Sep. 30, 2009

(65) Prior Publication Data
US 2011/0075459 A1   Mar. 31, 2011

(51) Int. Cl.
*G05F 1/10* (2006.01)
*G05F 1/40* (2006.01)

(52) U.S. Cl.
USPC .......................................... 323/222; 323/271

(58) Field of Classification Search
USPC ................. 323/222, 223, 225, 268, 271, 282, 323/284, 285
See application file for complete search history.

(56) References Cited

U.S. PATENT DOCUMENTS

| | | | |
|---|---|---|---|
| 7,215,560 B2 * | 5/2007 | Soldano et al. | 363/44 |
| 7,279,868 B2 * | 10/2007 | Lanni | 323/222 |
| 7,630,221 B2 * | 12/2009 | Sui et al. | 363/70 |
| 2011/0037444 A1 * | 2/2011 | Wildash | 323/210 |

* cited by examiner

*Primary Examiner* — Matthew Nguyen
(74) *Attorney, Agent, or Firm* — Harness, Dickey & Pierce, P.L.C.

(57) ABSTRACT

A cost effective solution for power factor correction in power devices operating at two widely separated input voltages comprises two unequal power rails. One power rail is optimized for operation at high line voltage only, while the other power rail is designed only for low line voltage. When operating at high line voltage, the second rail is disabled. At low line, both power rails are enabled but by virtue of unequal boost inductors, the high line power rail handles only about 30% of the power while the low line power rail handles the remaining power. Hence, the efficiency at high line voltage is maximized. As the inductance used in the high line power rail is much higher in value, it stays in continuous conduction mode for all load conditions and hence the power factor is significantly improved.

14 Claims, 3 Drawing Sheets

POWER FACTOR CORRECTION CIRCUITS, SYSTEMS AND POWER SUPPLIES OPERABLE WITH DIFFERENT INPUT VOLTAGES

FIELD

The present disclosure relates to the field of power factor correction. In particular, this disclosure relates to power factor correction operable with two different input voltages.

BACKGROUND

This section provides background information related to the present disclosure which is not necessarily prior art.

Some low power and medium power server power supplies are designed for wide range AC input voltages ranging from 90V AC to 265 VAC, for 120V and 230V utility lines. However, some data center applications are designed mainly for high line operations where the efficiency and power factor performances at high line AC inputs need to be maximum. Furthermore, data center applications demand high efficiency with high power factor at light load conditions (approx. 10% to 50% load).

In prior art PFC systems, the overall efficiency of the systems is compromised to enable the front end power factor correction boost converter systems to operate at two widely separated input AC voltages (i.e. low line and high line).

A prior art power factor correcting boost converter system 100 with a single power rail operating at two widely separated AC input voltages is illustrated in FIG. 1. The design requirements of a boost inductor L1, a switch Q1 and a boost diode D1 are different when operating at two widely separated AC input voltages. However, since there is a single power rail, the system works at a compromised efficiency.

Various techniques have been used to improve the power factor of a power supply.

SUMMARY

This section provides a general summary of the disclosure, and is not a comprehensive disclosure of its full scope or all of its features.

According to aspect of this disclosure, a power factor correction system (PFC) to correct the power factor of an input AC power supply to devices which need to operate at two widely separated input voltages, a high line voltage and a low line voltage includes at least two power rails coupled to the input AC power supply, said power rails comprising at least one high line power rail and at least one low line power rail, said high line power rail being adapted to operate at full power at said high line voltage and at approximately one third of the full power at said low line voltage, said low line power rail being adapted to operate at approximately two thirds of the full power at said low line voltage; a boost inductor in each of said power rails, said inductor in said low line power rail having approximately half the inductance of said inductor in said high line power rail; a semiconductor power switch in each of said power rails, said switch in said low line power rail having a relatively higher current carrying capacity than said switch in said high line power rail; a current sensing resistor coupled in series with the source terminals of said switches to sense the combined current through said boost inductors; a controller adapted to receive an input from said current sensing resistor and control the duty cycle of said switch in each of said power rails, to further control the flow of current to a load to achieve power factor correction; a boost diode in each of said power rails, said diode in said low line power rail having a relatively greater current handling capacity than said diode in said high line power rail; a gate driver for said switch in said high line power rail adapted to receive an input from said controller and generate a driving signal for the gate of said switch in said high line power rail; a gate driver for said switch in said low line power rail adapted to receive an input from said controller and generate a driving signal for the gate of said switch in said low line power rail; and an input AC power supply detection circuit adapted to receive an input from the input AC power supply, said circuit being coupled to said gate driver for said switch in said low line power rail to selectively disable said switch in said low line power rail at said high line voltage or enable said switch in said low line power rail at said low line voltage.

According to another aspect of the present disclosure, a power factor correction system (PFC) to correct the power factor of an input AC power supply to devices which need to operate at two widely separated input voltages, a high line voltage and a low line voltage includes at least two identical power rails coupled to the input AC power supply, said power rails comprising at least one high line power rail and at least one low line power rail, said high line power rail being adapted to operate at full power at said high line voltage and said low line power rail being adapted to share the power equally with said high line power rail at said low line voltage; a boost inductor in each of said power rails, said inductor in each of said power rails being identical and having approximately the same value of inductance; a semiconductor power switch in each of said power rails, said switch in each of said power rails being identical and having approximately the same rating; a current sensing resistor coupled in series with the source terminals of said switches to sense the combined current through said boost inductor; a controller adapted to receive an input from said current sensing resistor and control the duty cycle of said switch in each of said power rails, to further control the flow of current to a load to achieve power factor correction; a boost diode in each of said power rails, said diodes in each of said power rails being identical and having approximately the same rating; a gate driver for said switch in said high line power rail adapted to receive an input from said controller and generate a driving signal for the gate of said switch in said high line power rail; a gate driver for said switch in said low line power rail adapted to receive an input from said controller and generate a driving signal for the gate of said switch in said low line power rail; and an input AC power supply detection circuit adapted to receive an input from the input AC power supply, said circuit being coupled to said gate driver for said switch in said low line power rail to selectively disable said switch in said low line power rail at said high line voltage or enable said switch in said low line power rail at said low line voltage.

According to another aspect of this disclosure, a method for power factor correction of an input AC power supply to devices operating at two widely separated input voltages, a high line voltage and a low line voltage includes providing at least two power rails, one for each of said high line voltage and input low line voltage respectively; providing a boost inductor, a semiconductor switch and a boost diode in each of said power rails; sensing the input AC power supply to detect said high line voltage or said low line voltage; sensing the current flowing through said boost inductor in each of said power rails; using a sensed current to selectively control the operation of said switch in each of said power rails to further control the flow of current to a load to achieve power factor correction; enabling said power rails at said low line voltage; and enabling only said high line power rail at said high line voltage According to yet another aspect of this disclosure, a power factor correction (PFC) circuit includes an input to receive one of a first voltage and a second voltage. The first voltage has a magnitude larger than the second voltage. The PFC circuit includes an output for providing a direct current (DC) output. A first power rail is coupled between the input and the output. The first power rail is adapted to convert the first voltage to the DC output. A second power rail is coupled between the input and the output. The second power rail is adapted to convert the second voltage to the DC output. The PFC circuit is configured to operate the first power rail when the first voltage is coupled to the input and to operate the first and second power rails when the second voltage is coupled to the input.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes of selected embodiments only and are not intended to limit the scope of the present disclosure.

DETAILED DESCRIPTION

Figure 1:
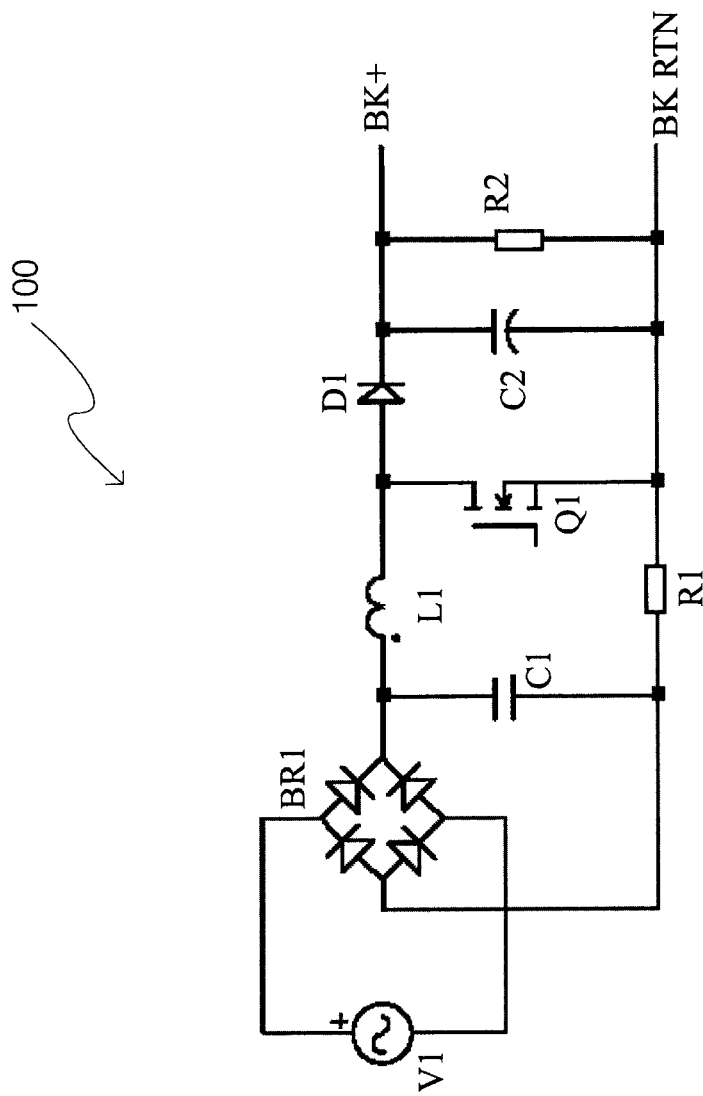
FIG. 1 is a circuit diagram of a prior art power factor correcting boost converter with a single power rail operating at two widely separated AC input voltages.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

According to one aspect of this disclosure, a power factor correction (PFC) circuit includes an input to receive one of a first voltage and a second voltage. The first voltage has a magnitude larger than the second voltage. The PFC circuit includes an output for providing a direct current (DC) output. A first power rail is coupled between the input and the output. The first power rail is adapted to convert the first voltage to the DC output. A second power rail is coupled between the input and the output. The second power rail is adapted to convert the second voltage to the DC output. The PFC circuit is configured to operate the first power rail when the first voltage is coupled to the input and to operate the first and second power rails when the second voltage is coupled to the input.

The first voltage and the second voltage may be any suitable voltages. The first and second voltages may be DC input voltages or AC input voltages. If the first and second voltages are AC input voltages, the first and second voltages may be rectified to DC input voltages by any appropriate rectifier. The first voltage may be, for example, a 230 volt AC input voltage and the second voltage may be a 115 volt AC input voltage.

The first power rail may be a first boost converter and the second power rail may be a second boost converter. The first boost converter includes a first boost inductor and the second boost converter includes a second boost inductor.

The first and second boost inductors may have the same inductance. When the first and second boost inductor have about the same inductance, the first power rail and the second power rail will each handle approximately the same amount of current when the input is the second voltage.

Alternatively, the first boost inductor may have a different inductance than the second boost inductor. The second boost inductor may have less inductance than the first boost inductor. Accordingly, the second power rail will carry more current than the first power rail when the input is the second voltage. In at least one embodiment, the second boost inductor has about half the inductance of the first boost inductor. In such an embodiment, the second power rail will carry about two-thirds of the total current of the PFC circuit, while the first power rail will carry about one-third of the total current.

Without limiting the aspects and/or embodiments discussed above, further embodiments of the present disclosure, which may or may not include one or more aspect discussed above, will be discussed hereinafter.

The present disclosure envisages a cost effective solution for delivering same level of power at both low line and high line voltages with high efficiency and power factor for all load conditions.

Figure 2:
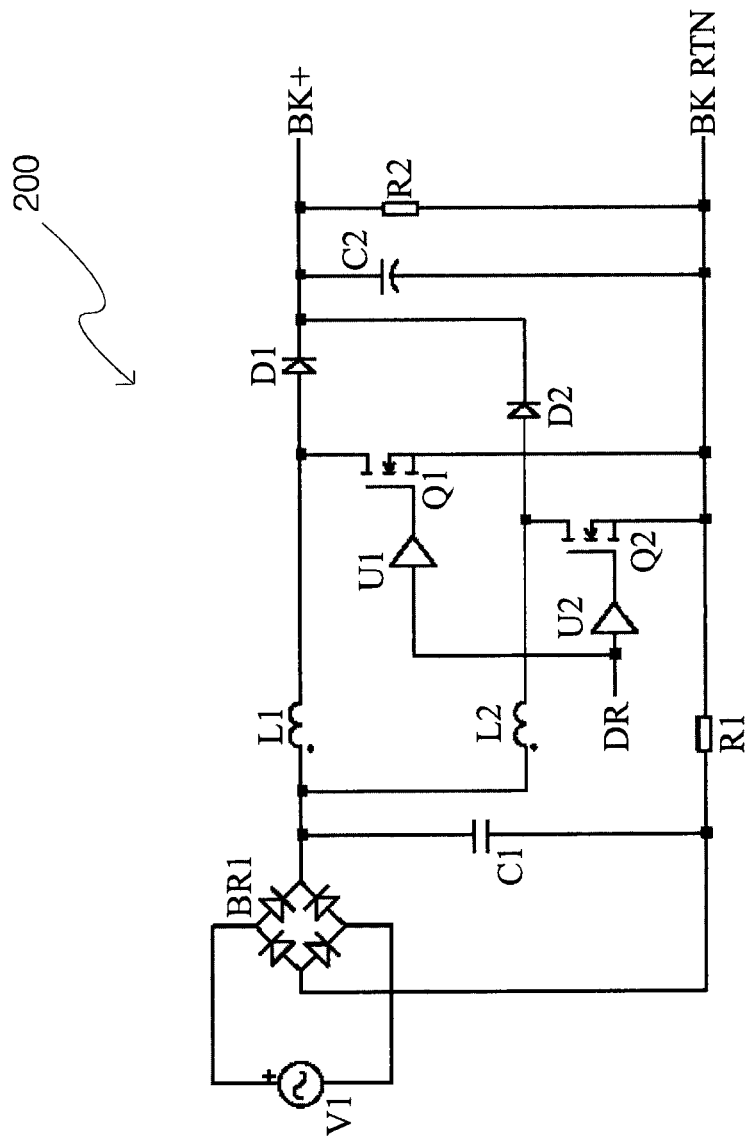
FIG. 2 is a circuit diagram of a power factor correcting boost converter according to one example embodiment of the present disclosure.

FIG. 2 illustrates a power factor correcting boost converter system in accordance with the present disclosure and is indicated generally by numeral 200. The system 200 illustrates a power converter operating on two power rails, one power rail being a high line (230V AC) and the other being a low line (120V AC). Two boost inductors L1 and L2, two semiconductor power switches Q1 and Q2 and two boost diodes D1 and D2 are provided, one for each power rail.

The two power rails may be the same as each other or different from each other. When the two power rails are different from each other, at least one component of one of the power rails differs from a similar component in the other power rail. In such embodiments, one rail will carry more current than the other rail at times when both rails are operating. When designed to be the same, the components in each power rail are generally the same and have the same nominal component values (e.g., inductance resistance, etc.). In such embodiments, both power rails will carry about the same amount of current at such times as both rails are operating.

In at least one embodiment, the power rails are not identical. The boost inductors L1 and L2 are different. The inductors L1 and L2 may have different design criteria, wire size, number of turns and inductance values. The boost inductors L1 and L2 may or may not use identically sized magnetic cores. It is also possible to use different core materials for the two boost inductors L1 and L2. The inductance value of the boost inductor L1 may be greater than that of the boost inductor L2.

The switches Q1 and Q2 and the diodes D1 and D2 may also have different specifications, if required. The current ratings of the switch Q2 and the boost diode D2 in the low line power rail may be greater than that of the switch Q1 and the boost diode D1 to handle higher peak and RMS currents at low line voltage. The rating of a device typically refers to the limiting values of operating conditions outside which the device could be damaged. For instance, typical ratings of a diode include the peak inverse voltage (PIV) or the maximum voltage that a diode can withstand in the reverse direction without breaking down, maximum repetitive reverse voltage (Vrrm) or the maximum amount of voltage the diode can withstand in reverse-bias mode, in repeated pulses and the like. Again, the ratings of a semiconductor switch typically include the current rating or the maximum current the switch is designed to carry and the voltage rating or the maximum voltage allowable in the circuit in which the switch is used.

The system 200 is described herein below, wherein the boost inductor L1, the switch Q1 and the diode D1 are first designed for the high line power rail without any consideration to low line conditions while the boost inductor L2, the switch Q2 and the diode D2 are designed for the low line power rail such that they handle approximately two third of the power at low line. V1 represents an input AC supply with voltage ranging from 90V AC to 265V AC. BR1 represents a diode bridge rectifier for the conversion of the input alternating current (AC) into direct current (DC) output.

In order to control the current flowing to a load R2, a controller represented by DR is provided to control the duty cycle of the switches Q1 and Q2. A current sensing resistor R1 is coupled in series with the source terminal of the switches Q1 and Q2 and the voltage across the resistor R1 provides the necessary signal to the controller DR so that the duty cycle of switches Q1 and Q2 can be controlled and as a result the power factor can be suitably corrected. The resistor R1 is referenced to a bulk negative return power rail BK RTN. The controller DR uses the same reference BK RTN. BK+ represents a bulk positive power rail of the system.

U1 and U2 are gate drivers for the switches Q1 and Q2 respectively. The gate drivers U1 and U2 accept an input from the controller DR and produce an appropriate low impedance gate drive for the switches Q1 and Q2 respectively. An input AC supply detection circuit (not shown) senses the input line voltage to determine whether it is a high line or low line voltage. The output of the gate driver U2 is disabled at high line voltage and enabled at low line voltage depending on the sensed input voltage. The system in accordance with the present disclosure generates an output for either the high line or the low line voltage. It is not possible for both the input voltages to coexist at the same time.

At high line voltage, only the associated power rail of the boost PFC including the boost inductor L1, the switch Q1, the gate drive U1 and the boost diode D1 operate while the low line power rail is disabled. The design of the high line power rail is independent of the low line operation. Thus the components in the high line power rail are designed for full power (the maximum power that the system can generate). At high line voltage, the input current is much lower than at low line voltage. As a result, the copper losses in the inductor L1 as well as the conduction losses of the boost switch Q1 are negligible but core losses become significant. As the design of the high line power rail focuses only on high line voltage with no regards to low line input currents, inductor L1 with relatively thinner wires and higher number of turns are used. This reduces flux density and high inductance can be achieved. Since the conduction losses decrease in proportion to the square of the current, they become insignificant at lighter loads (approx. 10% to 50% load). The inductance of inductor L1 is selected such that the system remains in continuous conduction mode and the power factor is improved at light load conditions. Thus, maximum possible efficiency at desired high line voltage and load conditions is achieved. However, the design must make sure that the thermal requirements are met at full load and light load condition for the high line input voltage and the ambient temperature.

At low line voltage, both the power rails are enabled and operate simultaneously. However, because the power rails are not the same, the power handled by the power rails is unequal. The power rail for low line voltage is designed only for about two-thirds of the full power. The power rails are adapted to deliver power at the low line voltage in a manner that the ratio of power handled by the high line power rail to the low line power rail is approximately equal to the ratio of the low line voltage to the high line voltage. The ratio of the values of inductances of the boost inductors L1 and L2 in the high line power rail and the low line power rail respectively are proportional to the power sharing requirement ratio of the power rails. It is ensured that the inductance of the boost inductor L2 in the low line power rail is approximately one half of the inductance of the boost inductor L1 in the high line power rail at full load, the current carrying capacity of the switch Q1 in the high line power rail is approximately half the current carrying capacity of the switch Q2 in the low line power rail and the peak and RMS current capacity of the diode D1 in the high line power rail is approximately half of the peak and RMS current capacity of the diode D2 in the low line power rail. The ratio of the value of L1 and L2 ensures that when the switches Q1 and Q2 are both switched simultaneously, the boost inductor L1 handles only about one third of the voltage. This technique makes sure that the thermal behavior and management for the high line power rail remains the same at both the widely separated AC input voltages. The boost inductor L2 in the low line power rail is smaller in inductance and it uses relatively thicker wires to manage the relatively higher current flowing through it.

Figure 3:
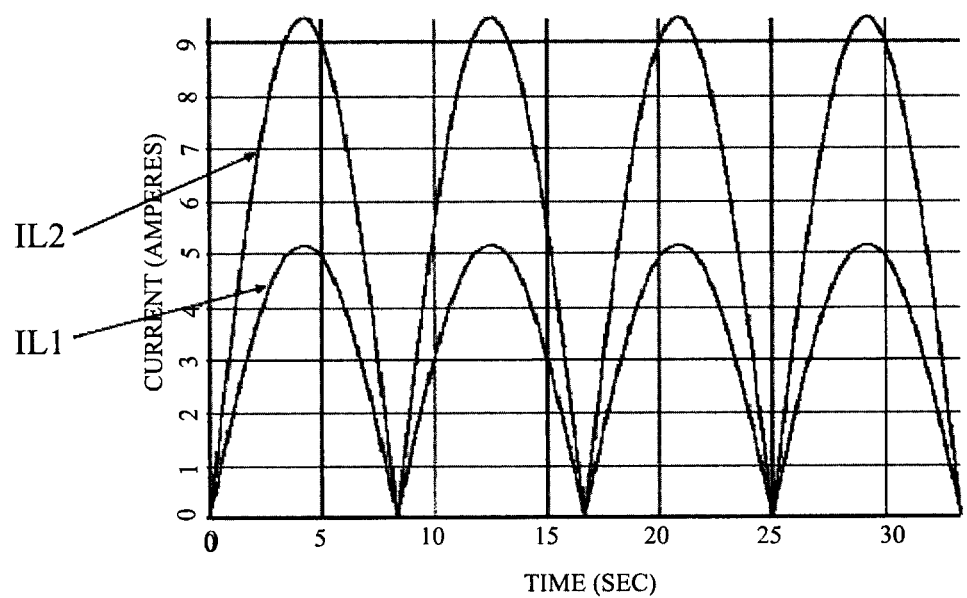
FIG. 3 is a graph of current (in amperes) through the boost inductors versus time (in seconds) of the power factor correcting circuit of FIG. 2 operating at a low line voltage.

FIG. 3 illustrates a graph of current (in amperes) through the boost inductors versus time (in seconds) of a power factor correcting circuit of FIG. 2 operating at low line voltage. IL2 represents the current through the inductor L2 and IL1 represents the current through the inductor L1 when both the power rails are enabled at low line voltage. It is clearly evident from the graphs that the inductor L2 delivers about two thirds of the total current where as the inductor L1 delivers about one third of the total current.

The current flowing through the current sensing resistor R1 is the sum of the currents flowing through the boost inductors L1 and L2. Thus the control circuit DR receives the sensed current signal from R1 and operates without knowing that there is unequal power sharing between the two power rails.

At low line voltage, the capacitive switching losses will be relatively higher due to the higher number of switching devices, since both the power rails are enabled at low line voltage. Devices with relatively higher current carrying capacity are necessary for handling the line current at low line voltage. However, the power devices in the low line power rail and core losses of the low line boost inductor are absent at high line operation.

As discussed above, power rails may also be the same such that they share the power equally at low line voltage, one of them being disabled at high line voltage. This may offer improved efficiency and power factor performance at high line voltage as compared to prior art systems. At low line voltage, each power rail will handle about one-half of the total current in the PFC system.

According to another aspect of the present disclosure, it is also possible to use more than two power rails, all equal or unequal in size and enable or disable them according to the line and load conditions.

Simulation results of converters designed in accordance with the present disclosure show that the efficiency of the boost front end at high line voltage can be as high as a quasi-bridgeless boost converter which uses two input AC rectifier diodes but it is achieved at a much lower cost.

The system in accordance with the present disclosure can be used in other variants of active power factor correction circuits including continuous current mode boost PFC, discontinuous current mode boost PFC, boundary mode conduction PFC, multi phase PFC boost converters, buck-boost PFC and buck mode PFC.

Although the system in accordance with the present disclosure has been described herein above with reference to a boost converter system, it can be used for any application that operates at two widely separated input voltages.

A power factor correction system as described in this disclosure has several technical advantages including but not limited to the realization of:
  a power factor correction system for devices operating at two widely separated input voltages;
  a cost effective solution for devices operating at two widely separated input voltages;
  a power factor correction system that has a high efficiency at both high line and low line voltages;
  a power factor correction system that improves the power factor at high line voltage and light loads;
  a power factor correction system that has a high efficiency at high line voltage and light loads;
  a power factor correction system that is compact; and
  a power factor correction system that has very simple control means.

Furthermore, present invention can also be used for DC input systems having very wide input range. One such example is the DC to DC converters used in Telecommunication which need to operate over input voltage range of 36 VDC to 72 VDC.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed:

1. A power factor correction system (PFC) for generating an output voltage from an input voltage, the PFC system comprising:
  an input for receiving the input voltage;
  an output for outputting the output voltage;
  a first power rail coupled to the input and the output to receive the input voltage and generate the output voltage, the first power rail including a first inductor having a first inductance value;
  a second power rail coupled to the input and the output, the second power rail selectively operable to generate the output voltage, the second power rail including a second inductor having a second inductance value;
  a controller configured to selectively operate or not operate the second power rail to generate the output voltage based on a magnitude of the input voltage.

2. The PFC system of claim 1 wherein the controller is configured to operate the second power rail when the magnitude of the input voltage is less than or equal to a threshold value and to not operate the second power rail when the magnitude of the input voltage exceeds the threshold voltage.

3. The PFC system of claim 2 wherein the controller is coupled to the input and configured to detect the magnitude of the input voltage.

4. The PFC system of claim 3 wherein the first power rail includes a first switch, the second power rail includes a second switch, and the controller is configured to generate a control signal to control switching of the first switch and the second switch to generate the output voltage.

5. The PFC system of claim 4 wherein the second power rail includes a driver coupled to receive the control signal from the controller and drive the second switch, and wherein the controller is configured to disable the second driver when the magnitude of the input voltage exceeds the threshold voltage.

6. The PFC system of claim 5 wherein the first inductance value and the second inductance value are different.

7. The PFC system of claim 6 wherein the first inductance value is about twice the second inductance value.

8. A power factor correction system (PFC) for generating an output voltage from an input voltage, the PFC system comprising:
  an input for receiving the input voltage;
  an output for outputting the output voltage;
  a first power rail coupled to the input and the output to receive the input voltage and generate the output voltage, the first power rail including a first switch;
  a second power rail coupled to the input and the output, the second power rail operable to generate the output voltage, the second power rail including a second switch;
  a controller coupled to the first rail and the second rail, the controller configured to generate a control signal for controlling the first switch and the second switch to produce the output voltage; and
  a detection circuit coupled to the input and the second power rail, the detection circuit configured to detect a magnitude of the input voltage and to prevent the second switch from being switched in response to the control signal when the magnitude of the input voltage exceeds a threshold voltage.

9. The PFC system of claim 8 further comprising a first driver coupled between the controller and the first switch and a second driver coupled between the controller and the second switch, the first driver switching the first switch in response to the control signal, and the second driver switching the second switch in response to the control signal.

10. The PFC system of claim 9 wherein the detection circuit is configured to prevent the second switch from being switched in response to the control signal by disabling the second driver when the magnitude of the input voltage exceeds the threshold voltage.

11. The PFC system of claim 10 wherein the first power rail includes a first inductor having a first inductance value and the second power rail includes a second inductor having a second inductance value different from the first inductance value.

12. The PFC system of claim 11 wherein the first inductance value is about twice the second inductance value.

13. The PFC system of claim 10 wherein the first power rail includes a irst inductor having a first inductance value and the second power rail includes a second inductor having a second inductance value about the same as the first inductance value.

14. The PFC system of claim 10 wherein the first power rail and the second power rail are substantially identical.

* * * * *